United States Patent
Gautier et al.

(10) Patent No.: US 10,043,629 B2
(45) Date of Patent: Aug. 7, 2018

(54) CUT-OFF MEMBER OF A DEVICE FOR PROTECTING AN ELECTRIC INSTALLATION AGAINST LIGHTNING

(71) Applicant: ABB FRANCE, Cergy Saint Christophe (FR)

(72) Inventors: Boris Gautier, Lourdes (FR); Malvina Claverie, Lannemezan (FR)

(73) Assignee: ABB FRANCE, Cergy Saint Christophe (FR)

( * ) Notice: Subject to any disclaimer, the term of this patent is extended or adjusted under 35 U.S.C. 154(b) by 0 days.

(21) Appl. No.: 14/855,349

(22) Filed: Sep. 15, 2015

(65) Prior Publication Data

US 2016/0079026 A1 Mar. 17, 2016

(30) Foreign Application Priority Data

Sep. 16, 2014 (FR) ...................................... 14 58707

(51) Int. Cl.
*H01H 85/055* (2006.01)
*H02H 9/00* (2006.01)
(Continued)

(52) U.S. Cl.
CPC .......... *H01H 85/055* (2013.01); *H01H 85/38* (2013.01); *H02H 9/005* (2013.01);
(Continued)

(58) Field of Classification Search
CPC .... H01H 85/055; H01H 85/38; H01H 85/547; H01H 2085/0486; H01H 2085/383;
(Continued)

(56) References Cited

U.S. PATENT DOCUMENTS 2,305,436 A * 12/1942 McMorris .............. H01H 85/44
313/146
3,002,071 A 9/1961 Storsand
(Continued)

FOREIGN PATENT DOCUMENTS

DE 2213985 A1 * 9/1973 ............. H01H 85/38
DE 2434897 A1 2/1976
(Continued)

OTHER PUBLICATIONS

Friedrich, Burhorn, Ueberstrom-Und Kurzschlussicherung, Sep. 27, 1973, Machine Translation.*
(Continued)

*Primary Examiner* — Anatoly Vortman
*Assistant Examiner* — Stephen Sul
(74) *Attorney, Agent, or Firm* — Cantor Colburn LLP

(57) ABSTRACT

The present invention relates to a cut-off member intended to be electrically series-connected to an electric circuit comprising a device for protecting an electric installation against lightning, the cut-off member (1) comprising:
  a first conducting armature (7) electrically connected to a first coupling terminal (3) to the electric circuit and a second conducting armature (9) electrically connected to a second coupling terminal (5) for coupling to the electric circuit;
  at least one fuse element (11) disposed between the first conducting armature (7) and the second conducting armature (9) and electrically connected to the first conducting armature (7) and to the second conducting armature (9), the at least one fuse element (11) being arranged to melt when it is crossed by a current of a threshold intensity over a threshold period of time;
  a device for increasing a peak arc voltage (15) between the first conducting armature (7) and the second con-
(Continued)

ducting armature (9) in the case of melting of the at least one fuse element (11).

6 Claims, 1 Drawing Sheet

(51) Int. Cl.
  *H01H 85/38* (2006.01)
  *H01H 9/36* (2006.01)
  *H01H 85/54* (2006.01)
  *H01H 85/048* (2006.01)
(52) U.S. Cl.
  CPC ............ *H01H 9/36* (2013.01); *H01H 85/547* (2013.01); *H01H 2085/0486* (2013.01); *H01H 2085/383* (2013.01)
(58) Field of Classification Search
  CPC ........ H01H 9/36; H01H 37/761; H02H 9/005; H01T 1/00; H01T 1/14; H01T 4/00; H01T 4/02; H05B 3/746
  USPC .................................................... 337/142, 28
  See application file for complete search history.

(56) References Cited

U.S. PATENT DOCUMENTS

| | | | |
|---|---|---|---|
| 4,019,006 A | 4/1977 | Strossner | |
| 5,659,284 A * | 8/1997 | Olofsson | H01H 85/048 337/290 |
| 6,784,783 B2 | 8/2004 | Scoggin et al. | |
| 2008/0192400 A1 * | 8/2008 | Lafon | H01H 9/36 361/117 |
| 2010/0315753 A1 * | 12/2010 | Mosesian | H01H 85/12 361/104 |
| 2014/0327996 A1 * | 11/2014 | Westebbe | H01T 4/12 361/120 |
| 2015/0054614 A1 * | 2/2015 | Blewitt | H01H 85/0241 337/277 |

FOREIGN PATENT DOCUMENTS

| | | | | |
|---|---|---|---|---|
| EP | 1887667 A1 * | 2/2008 | ............ | H01T 1/14 |
| FR | 2917532 A1 | 12/2008 | | |

OTHER PUBLICATIONS

Ducourneau, Jean Bernard, Ignition Device with Two Electrodes for a Spark Gap and Corresponding Methods, Feb. 13, 2008, Machine Translation.*

Ducourneau Jean Bernard, "Ignition device with two electrodes for a spark gap and corresponding methods", ABB France, Feb. 13, 2008, Entire Document (Translation of EP 1887667).*

Burhorn Friedrich, "Ueberstrom-Und Kurzschlussicherung", Siemens, Sep. 27, 1973, Entire Document (Translation of DE 2213985).*

\* cited by examiner

CUT-OFF MEMBER OF A DEVICE FOR PROTECTING AN ELECTRIC INSTALLATION AGAINST LIGHTNING

CROSS REFERENCE TO RELATED APPLICATION

This application is related to and claims the benefit of French Patent Application Number 14/58707 filed on 16 Sep. 2014, the contents of which are herein incorporated by reference in their entirety.

TECHNICAL FIELD

The present invention relates to a cut-off member intended for protecting against abnormal current intensity elevations and more particularly from short-circuiting, a device for protecting an electric installation against lightening.

BACKGROUND

It is known to use fuse elements or standard circuit breakers for protecting from short-circuiting. However, these fuse elements or circuit breakers are not suitable for protecting lightning arresters. In fact, they are not specifically designed to resist shocks due to lightening and to open the electric circuit in a sufficiently short time for efficiently protecting the lightning arrester. As a result, it is required to oversize the inner connector technology of the lightning arrester and to compensate for the lack of reactivity of the cut-off member. This increases cost of these devices and the devices require a longer realization time.

BRIEF SUMMARY

The disclosure aims to resolve all or part of the aforementioned drawbacks.

The present invention relates to a cut-off member intended to be integrated in an electric circuit comprising a device for protecting an electric installation against lightning, the cut-off member being series mounted with respect to the device for protecting an electric installation and the cut-off member comprising:
  a first conducting armature electrically connected to a first coupling terminal to the electric circuit and a second conducting armature electrically connected to a second coupling terminal for coupling to the electric circuit;
  at least one fuse element disposed between the first conducting armature and the second conducting armature and electrically connected to the first conducting armature and to the second conducting armature, the at least one fuse element being arranged to melt when it is crossed by a current of a threshold intensity over a threshold period of time;
  a device for increasing a peak arc voltage between the first conducting armature and the second conducting armature in the case of melting of the at least one fuse element.

Thanks to the dispositions according to the invention, the cut-off member is suitable for in particular protecting electric installations against lightning. The combination of the device for increasing the peak arc voltage and the fuse allows at the same time to obtain an improved capacity of cutting off short circuit current and a heightened reactivity in the event of short circuiting of the lightning arrester.

According to an aspect of the invention, the cut-off member is branch mounted with respect to an electric installation to be protected against lightning.

According to an aspect of the cut-off member according to the invention, the at least one fuse element is arranged to melt when it is crossed by a current of an intensity capable of damaging the device for protecting an electric installation over a threshold period of time.

According to an aspect of the cut-off member according to the invention, the at least one fuse element is arranged to melt when it is crossed by a current of a threshold intensity over a period of time capable of damaging the device for protecting an electric installation.

According to an aspect of the cut-off member according to the invention, the threshold period of time is lower than a second and higher than a few microseconds.

According to an aspect of the invention, the threshold period of time is of the order of a few dozen milliseconds.

According to an aspect of the invention, the threshold period of time is between fifty milliseconds and two hundred milliseconds.

According to an aspect of the invention, the threshold period of time is of the order of one hundred and twenty milliseconds.

According to an aspect of the invention, the material constituting the fuse element is characterized by a resistivity between thirty and three hundred micro ohms per millimeter.

According to an aspect of the invention, the material constituting the fuse element is characterized by a resistivity between fifty and one hundred and fifty micro ohms per millimeter.

According to an aspect of the invention, the material constituting the fuse element is characterized by a resistivity of the order of one hundred micro ohms per millimeter.

According to an aspect of the invention, the fuse element section is between one and three square millimeters.

According to an aspect of the invention, the fuse is constituted of brass. In fact, brass has a resistivity of $3.91 \cdot 10^{-5}$ ohm/mm.

According to an aspect of the invention, the fuse element section constituted of brass is of one square millimeter.

According to an aspect of the invention, the fuse is constituted of mild steel. In fact, the mild steel has a resistivity of $1.1 \cdot 10^{-4}$ Ohm/mm.

According to an aspect of the invention, the fuse element section constituted of mild steel is of 1.5 mm$^2$.

According to optional features of the cut-off member according to the invention:
  the device for increasing a peak arc voltage comprises a plurality of deionization plates disposed facing an opening defined between the first conducting armature and the second conducting armature;
  the geometry of the first and second conducting armatures allows the displacement of the arc towards the deionization plates;
  getting closer to the deionization plates, the length of the electric arc increases. Thus, the peak arc voltage between the first and second conducting armatures increases and the formed electric arc tends to switch off;
  the electric arc may also be enlarged until it reaches the deionization plates. In this case, the electric arc may become separated into several small arcs, each formed between two consecutive deionization plates. The peak arc voltage between the first and second conducting armatures is hence equivalent to the sum of the peak arc voltages of the small arcs thus formed, the deionization plates are conducting;

the deionization plates define a space between them opening facing the opening between the first conducting armature and the second conducting armature;

the first conducting armature extends between a first connecting portion to the first coupling terminal to the electric circuit and a first end portion;

the second conducting armature extends between a second connecting portion to the second coupling terminal to the electric circuit and a second end portion;

the fuse element is disposed between the first and second conducting armature at the first end portion and the second end portion;

according to a first possibility, the device for increasing a peak arc voltage comprises at least a secondary conducting armature electrically connected to the first conducting armature by means of a first fuse element and to the second conducting armature by means of a second fuse element;

according to a second possibility, the device for increasing a peak arc voltage comprises at least two secondary conducting armatures electrically connected to each other by a fuse element. Several fuse elements are series mounted. When the fuse elements melt, the peak arc voltage between the main conducting armatures is equivalent to the sum of the peak arc voltages between the conducting armatures;

the secondary conducting armatures are substantially parallel.

The present invention also relates to an assembly comprising:

a device for protecting an electric installation against lightning;

a cut-off member in compliance with any one of the aforementioned features, series mounted with respect to the protective device.

According to optional features of the assembly according to the invention:

the cut-off member is removable from the electric circuit, thereby, the replacing and maintenance of the cut-off member are made easy;

the coupling terminals for coupling to the electric circuit are constituted by pins, thus allowing to easily place and remove the cut-off member from the electric circuit.

BRIEF DESCRIPTION OF THE DRAWINGS

Other features and advantages of the present invention will become apparent in light of the following description and upon examination of the accompanying figures, in which.

Over all these figures, identical or similar references designate identical or similar members or assemblies of members.

DETAILED DESCRIPTION

Figure 1:
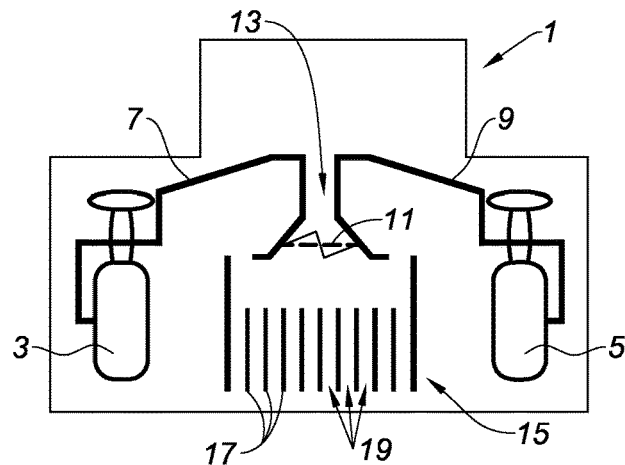
FIG. 1 represents a cut-off member according to a first embodiment.

A cut-off member 1 is represented on FIG. 1. The cut-off member 1 comprises a first coupling terminal 3 and a second coupling terminal 5 which are intended to be connected to an electric circuit. The electric circuit comprises a device for protecting an electric installation against lightning, here a lightning arrester. The cut-off member 1 is intended to be series mounted with the lightning arrester in order to protect it against short circuiting. The cut-off member 1 is hence disposed upstream of the lightning arrester in the electric circuit. The electric circuit also comprises an electric installation branch mounted with respect to the cut-off member 1 and to the lightning arrester. The lightning arrester is intended to protect the electric installation against overvoltages caused by lightning.

The cut-off member 1 comprises two main conducting armatures: a first conducting armature 7 electrically connected to the coupling terminal 3 and a second conducting armature 9 electrically connected to the coupling terminal 5. A fuse 11 is electrically connected on the one hand to the conducting armature 7 and on the other hand to the conducting armature 9.

The fuse 11 is capable of melting when the intensity of the current crossing the cut-off member 1 reaches threshold intensity during a threshold period of time.

The threshold period of time is the period of time from which the device for protecting an electric installation becomes damaged. The threshold period of time is lower than a second and higher than a few dozen microseconds and preferably of the order of a few dozen milliseconds. For example, a threshold period of time may be of the order of one hundred and twenty milliseconds.

The fuse 11 is capable of supporting an overvoltage due to lightning. In fact, such an overvoltage only intervenes during a period of time lower than the threshold period of time, necessary for destroying the fuse 11. Such an overvoltage intervenes for a few dozen microseconds, for example over a period of time of the order of fifty microseconds.

When the lightning arrester is short-circuited and the fuse 11 melts, the conducting armatures 7, 9 are no longer electrically connected and define an opening 13 between them.

A device for increasing the peak arc voltage between the conducting armatures 7, 9, here an arc control device 15, is disposed facing the opening 13. The arc control device 15 is constituted by a plurality of deionization plates 17. The deionization plates 17 define spaces 19 between them, opening facing the opening 13. The deionization plates 17 are substantially parallel.

In the event of short-circuiting of the lightning arrester, the cut-off member 1 is crossed by a current of intensity higher than the threshold intensity. The fuse becomes destroyed and a potential difference is established between the conducting armatures 7, 9 separated only by the opening 13. Starting from a threshold potential difference, called peak arc voltage, an electric arc is formed between the conducting armatures 7, 9. The formation of an electric arc allows the current to continue circulating in the electric circuit, reach the lightning arrester and destroy it.

The arc control device 15, allows switching off the electric arc by increasing the peak arc voltage between the conducting armatures 7, 9. In fact, the deionization plates 17 allow the elongation of the electric arc by drawing it towards them. When the electric arc reaches them, it is divided into several portions, each of the portions being formed between two consecutive deionization plates 17. In this manner, the peak arc voltage between the conducting armatures 7, 9 increases and the electric arc tends to switch off.

The temperature rise formula of the fuse 11 is as follows:

$$\Delta\theta = \frac{\rho I^2 t}{s^2 \omega c}$$

in which: $\Delta\theta$ is the temperature rise; $\rho$ is the resistivity of the material; I is the intensity; t is the duration; s is the section; $\omega$ is the mass density of the material and C is the thermal capacity of the material.

Preferably, the material constituting the fuse 11 is characterized by a resistivity between thirty and three hundred micro ohms per millimeter, and preferably of the order of one hundred micro ohms per millimeter, such as for example steel.

Preferably, the section of the fuse 11 is between one and three square millimeters.

According to an embodiment example of the invention, the fuse 11 is constituted of brass having a resistivity of $3.9.10^{-5}$ Ohm/mm, a specific heat capacity of 376 J/kg/° K, a mass density of $8.5.10^{-6}$ kg/mm$^3$, a melting temperature of 1300° C. and an elastic limit of 200 N/mm$^2$. For a thermal resistance to lighting, that is to say, for a temperature rise of around 200° C., for a wave 8/20 and under a current of around 40 kA, the fuse 11 must have a section of 1 mm$^2$. The burning time of such a fuse 11 under a current of 1000 A is of 0.12 s. The mechanical resistance to the traction of such a fuse 11 is 200N.

According to another embodiment example of the invention, the fuse 11 is constituted of mild steel having a resistivity of $1.1.10^{-4}$ Ohm/mm, a specific heat capacity of 480 J/kg/° K, a mass density of $7.8.10^{-6}$ kg/mm$^3$, a melting temperature of 1300° C. and an elastic limit of 240 N/mm$^2$. For a thermal resistance to lightning, that is to say for a temperature rise of around 200° C., for a wave 8/20 and under a current of around 40 kA, the fuse 11 must have a section of 1.5 mm$^2$. The melting time of such a fuse 11 under a current of 1000 A is of 0.12 s. The mechanical resistance to the traction of such a fuse 11 is 360N.

The use of materials of lower resistivity, for example copper, would imply a lower fuse section 11 and hence a lower mechanical resistance.

The use of materials of higher resistivity, for example stainless steel, would imply a higher fuse section 11 and hence an important volume of melting material, liable to pollute the inner parts of the cut-off member.

The use of materials such as brass and mild steel allow obtaining a noticeable mechanical resistance while limiting the fuse section, and hence obtaining a reasonable volume of melting material.

Figure 2:
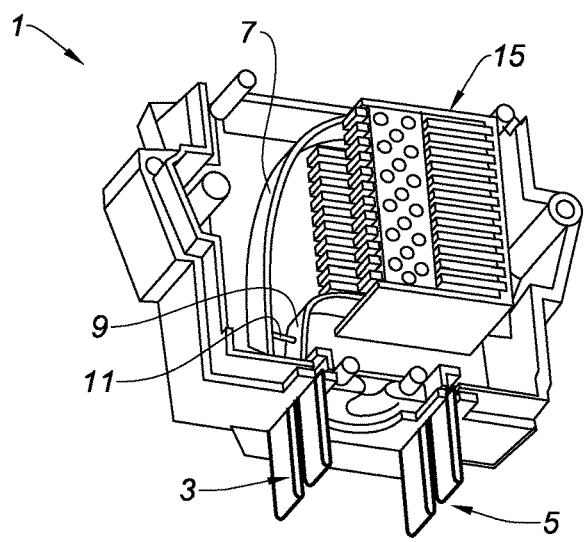
FIG. 2 represents a cut-off member according to a second embodiment.

According to a second embodiment represented on FIG. 2, the cut-off member 1 is disposed in a removable cartridge. The coupling terminals 7, 9 are constituted by pins 3, 5 allowing to couple and remove the cartridge easily from the electric circuit in case of replacing or maintenance of the cut-off member 1.

According to an aspect of the invention according to the first and second embodiments, the realization plates 17 are disposed according to a star configuration. In such a configuration, the spacing between two consecutive deionization plates 17 is reduced in the direction of the fuse 11.

Figure 3:
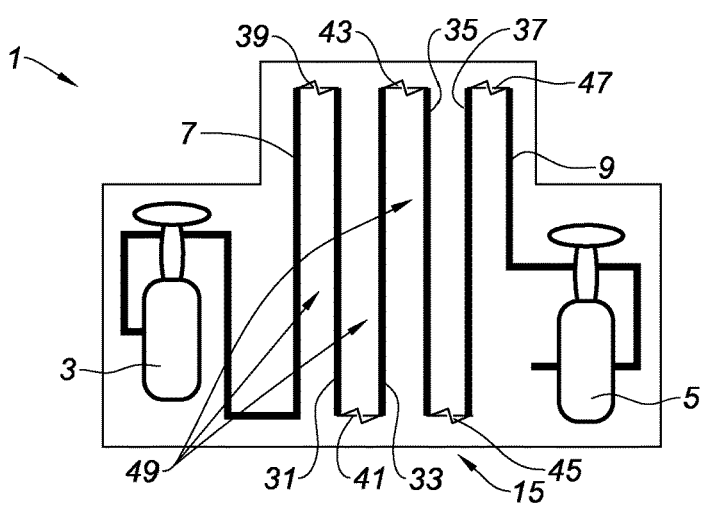
FIG. 3 represents a cut-off member according to a third embodiment.

According to a third embodiment represented on FIG. 3, the device for increasing the peak arc voltage 15 is constituted by a plurality of secondary conducting armatures disposed between the conducting armatures 7, 9. Here, four substantially parallel secondary conducting armatures 31, 33, 35, 37 are represented. The secondary conducting armatures 31, 33, 35, 37 are disposed between the conducting armatures 7, 9. A fuse 39 electrically connects the conducting armature 7 and the secondary conducting armature 31; a fuse 41 electrically connects the secondary conducting armature 31 and the secondary conducting armature 33; a fuse 42 electrically connects the secondary conducting armature 33 and the secondary conducting armature 35; a fuse 45 electrically connects the secondary conducting armature 35 and the secondary conducting armature 37; a fuse 47 electrically connects the secondary conducting armature 37 and the conducting armature 9. During the short-circuiting of the lightning arrester, the fuses 39, 41, 43, 45, 47 melt and become destroyed. The conducting armatures 7, 9 and the secondary conducting armatures 31, 33, 35, 37 are separated by openings 49. The peak arc voltage between the conducting armature 7 and the conducting armature 9 is equivalent to the sum of peak arc voltages between two conducting armatures 7, 9 and/or secondary adjacent conducting armatures 31, 33, 35, 37. Adding the secondary armatures 31, 33, 35, 37 hence allows increasing the peak arc voltage between the conducting armature 7 and the conducting armature 9.

The fuses used in this embodiment have the same features as the fuses described in the first embodiment.

According to a preferred embodiment of the invention, the device for increasing the peak arc voltage 15 includes about a dozen secondary conducting armatures, substantially parallel and disposed between the conducting armatures 7 and 9.

The dispositions according to the invention advantageously allow the use of standard fuses or circuit breakers, from the shops. For example, the use of a cylindrical 125 A gG fuse 22*58 is suitable for implementing a cut-off member according to the invention.

Obviously, the present invention is not limited to the described and represented embodiments, provided by way of illustrating and non limiting examples.

The invention claimed is:

1. A cut-off member intended to be integrated in an electric circuit that comprises a device for protecting an electric installation against lightning, the cut-off member being series mounted with respect to the device for protecting an electric installation and the cut-off member comprising:
   a first conducting armature electrically connected to a first coupling terminal for coupling to the electric circuit and a second conducting armature electrically connected to a second coupling terminal for coupling to the electric circuit;
   at least one fuse element disposed between the first conducting armature and the second conducting armature and electrically connected to the first conducting armature and to the second conducting armature, the at least one fuse element being arranged to melt when it is crossed by a current of a threshold intensity over a threshold period of time;
   a device for increasing a peak arc voltage in the case of melting of the at least one fuse element, said device for increasing a peak arc voltage being constituted by a plurality of secondary conducting armatures disposed between the first conducting armature and the second conducting armature, the plurality of secondary conducting armatures being aligned in a parallel way in a space defined between the first conducting armature and the second conducting armature wherein the secondary conducting armatures are separated by openings, the at least one fuse element comprising a first fuse element connecting a first secondary conducting armature of the plurality of secondary conducting armatures to the first conducting armature, and a second fuse element connecting a second secondary conducting armature of the plurality of secondary conducting armatures to the second conducting armature, and further fuse elements each connecting a secondary conducting armature of the plurality of secondary conducting armatures with a contiguous secondary conducting armature of the plurality of the secondary conducting armatures.

2. The cut-off member according to claim 1, wherein the material constituting the fuse element comprises a resistivity between thirty and three hundred microohms per millimeter.

3. The cut-off member according to claim 1, wherein the fuse element width is between one and three square millimeters.

4. An assembly comprising:
a device for protecting an electric installation against lightning integrated to an electric circuit;
a cut-off member according to claim 1, integrated to the electric circuit and series-mounted with respect to the protective device.

5. The assembly according to claim 4 wherein the cut-off member is removable from the electric circuit.

6. The assembly according to claim 5, wherein the coupling terminals for coupling to the electric circuit are constituted by pins.

* * * * *